United States Patent [19]

Zhong et al.

[11] Patent Number: 5,604,275
[45] Date of Patent: Feb. 18, 1997

[54] COLOR STABILIZED AQUEOUS N-VINYL HETEROCYCLIC COPOLYMER SOLUTIONS

[75] Inventors: Yuanzhen Zhong, Wayne; Philip F. Wolf, Bridgewater, both of N.J.

[73] Assignee: ISP Investments Inc., Wilmington, Del.

[21] Appl. No.: 534,753

[22] Filed: Sep. 27, 1995

Related U.S. Application Data

[63] Continuation-in-part of Ser. No. 355,370, Dec. 13, 1994, abandoned.

[51] Int. Cl.$^6$ ............................................. C08K 5/35
[52] U.S. Cl. ..................... 524/96; 524/183; 524/185; 524/379; 524/404; 524/405; 524/443; 524/492
[58] Field of Search ........................... 524/96, 185, 404, 524/492, 183, 379, 405, 443

[56] References Cited

U.S. PATENT DOCUMENTS

| | | | |
|---|---|---|---|
| 2,872,433 | 2/1959 | Glickman | 260/45.7 |
| 3,415,776 | 12/1968 | White | 524/185 X |
| 4,567,040 | 1/1986 | Varco et al. | 524/185 X |
| 5,126,395 | 6/1992 | End et al. | 524/801 |
| 5,319,041 | 6/1994 | Zhong et al. | 526/73 |

FOREIGN PATENT DOCUMENTS

| | | | |
|---|---|---|---|
| 0678855 | 1/1964 | Canada | 524/185 |

*Primary Examiner*—Judy M. Reddick
*Attorney, Agent, or Firm*—Walter Katz; Marilyn J. Maue; Joshua J. Ward

[57] ABSTRACT

This invention relates to an N-vinyl heterocyclic copolymer in substantially pure deionized water or in aqueous alcoholic solution which exhibits significantly reduced color and odor and which is obtained by contacting an alcohol-copolymer mixture with water and a nitrogen containing, trivalent boron complex compound selected from the group of borane-ammonia, borane-lower alkylamine, tetra-lower alkyl ammonium octahydrotriborate, morpholine-borane, lower alkyl morpholine-borane, silylamino borane and mixtures thereof and stripping alcohol from the resulting mixture under vacuum at between about 100 and about 740 mm Hg below absolute whereby an aqueous, 10–70 wt. % solids solution of the copolymer is obtained having a water white color stability of more than a year.

14 Claims, No Drawings

COLOR STABILIZED AQUEOUS N-VINYL HETEROCYCLIC COPOLYMER SOLUTIONS

This application is a Continuation-In-Part of U.S. application Ser. No. 08/355,370 filed Dec. 13, 1994 and now abandoned.

BACKGROUND OF THE INVENTION

N-vinyl lactam polymers are important components in many color sensitive systems including their use as resins for the spinning of fabrics, emulsions for fabric print pastes, dye substantivity additives and other applications where high processing temperatures are employed. These polymers are also useful in cosmetic and pharmaceutical arts where color development as well as unpleasant odors are highly objectionable. A major disadvantage associated with the use of such lactam and other N-vinyl heterocyclic copolymers is their tendency to rapidly yellow or darken upon standing or heating, which problem exists whether or not the heterocyclic vinyl monomer solution as introduced into the polymerization reactor or the alcoholic solution of the recovered corresponding copolymeric-alcohol product, is initially colorless. Hence it is believed that chromophores or other color forming impurities introduced with the heterocyclic monomer are formed during polymerization and rapidly deteriorate upon standing.

Various proposals to overcome or ameliorate this problem by introducing various stabilizing agents, such as ion exchange resins, absorbants and/or oxidizing agents into the water or aqueous alcohol solutions during, before or after solvent exchange have not proven satisfactory and have not achieved long term water white color stability. Indeed, several stabilizers, optionally used with adjuvants, have additionally imparted an unpleasant odor to the end product or themselves have exhibited corrosive properties owing to acidic pH levels below 4.0, thus introducing further problems, increasing costs and/or limiting the copolymer concentration in many formulations.

Accordingly it is an object of the present invention to overcome the above problems and deficiencies associated with solutions of N-vinyl heterocyclic, particularly N-vinyl lactam copolymers in aqueous solutions.

Another object of the invention is to provide a color stable, odorless solution of an N-vinyl heterocyclic copolymer, which is normally susceptible to discoloration as well as providing an aqueous solution of said copolymers which has long term storage stability and is compatible with components of cosmetic, pharmaceutical and other formulations.

Still another object is to provide the above advantages by a commercially feasible and economically attractive process.

These and many other advantages of the invention will become apparent from the following description and disclosure.

THE INVENTION

In accordance with this invention there is provided a color stabilized water or aqueous alcohol solution containing (a) deionized water, (b) between about 10 and about 70 wt. % of a N-vinyl heterocyclic copolymer based on total solution and (c) a nitrogen containing, trivalent boron complexed compound in a concentration of between about 0.02 and about 2 wt. % based on copolymer.

In this application, "lower alkyl" refers to a $C_1$ to $C_4$ alkyl group.

The trivalent boron complexed compounds of this invention include organic and inorganic nitrogen containing compounds such as, for example, borane ammonia ($BH_3$–$NH_3$); morpholine borane optionally substituted with a lower ($C_1$ to $C_4$) alkyl group, e.g. 4-ethyl morpholine borane; borane $C_1$–$C_4$ alkyl amine, e.g. borane t-butyl amine ($[CH_3]_3C$—$NH_2$—$BH_3$), borane trimethyl amine; a tetra lower alkyl ammonium octahydrotriborate, e.g. tetramethyl ammonium octahydro triborate and a silicon containing borane, e.g. silylamino borane ($SiH_3$—$BH_2$—$NH_3$). The borane complex stabilizer of the present invention is contacted with the copolymer solution before discoloration occurs, i.e. immediately after copolymer recovery from the polymerization reactor and before any operation involving solvent exchange with deionized water for partial or complete stripping of alcohol from the copolymer solution. Observance of this timely introduction of complex is crucial in the recovery of a stable, substantially colorless copolymer solution having a shelf life of more than a year, since it is found that the present complex functions primarily as a color forming inhibitor and not as a bleaching or color lightening agent for polymer solutions which already have been allowed to yellow or darken. Of the above borane stabilizers, the preferred species, from the standpoint of cost and availability, are the borane lower alkyl amines, e.g. borane t-butyl amine.

When the borane/ammonia complex is selected as the stabilizing agent, an initial release of ammonia causes an objectionable odor and produces a relatively high pH. However, when this stabilizer is added as a solution containing 0.005 to 1.0 wt. % of a weak organic acid, e.g. acetic acid, these effects are minimized to acceptable levels.

The concentration of borane complex added to the copolymer-alcohol mixture from the reactor or to the alcohol copolymer solution prior to solvent exchange with deionized water, is most beneficially between about 0.05 and about 0.2 wt. % of copolymer; although lower or higher amounts within the above range can be used.

The N-vinyl heterocyclic monomers of the present invention are those having 3 to 6 ring carbon atoms and include N-vinyl pyrrolidone, N-vinyl imidazole, N-vinyl morpholine, N-vinyl pyridine and N-vinyl caprolactam, each of which can be optionally substituted on a carbon of the N-heterocyclic ring with lower alkyl. Suitable comonomers of the present copolymer are vinyl lower alkyl esters, eg. vinyl acetate, vinyl propionate, vinyl butyrate, methyl acrylate, ethyl acrylate; acrylonitrile; styrene and mixtures thereof.

The copolymers of this invention are desirably those containing from about 40 to about 80 wt. % of the N-vinyl heterocyclic monomer and from about 20 to about 60 wt. % of the copolymerizable vinyl comonomer having a random, graft, linear or branched structure. These copolymers are further characterized as having a K value of from about 10 to about 100, corresponding to a number average molecular weight of from about 500 to about 300,000. Preferred are the copolymers having a K value of about 20–50 and a molecular weight of about 10,000–100,000. Also, the preferred copolymer species of this invention are the N-vinyl pyrrolidone/vinyl acetate (VP/VA) copolymers in a weight ratio of between about 50–80 parts lactam (e.g. VP) to 50–20 parts comonomer such as vinyl acetate (VA); most desirably a weight ratio of 55–70 parts VP and 45–30 parts VA, which appear to be copolymers most needful of color stabilization.

The present copolymers are conventionally obtained as 10–80 wt. % solids solutions from a free radical initiated solution polymerization wherein a lower alkanol, notably ethanol, isopropyl alcohol and/or t-butanol, is employed as the solvent medium. Although the copolymer/alcohol solutions themselves are useful for several commercial applications, such as in adhesives, grooming agents, e.g. hair sprays, wave setting lotions, shampoos, hair tints, dyes and rinses, photosensitive film protectants, plant sprays, shoe and furniture polishes and decorative sprays, a great number of consumers require aqueous solutions of the copolymer. It is at this stage of solvent exchange that the greatest degree of discoloration potential exists and continuous and cumulative yellowing or darkening occurs during subsequent standing or storage. Yellowing of the alcoholic copolymer solutions is also observed but to a lesser extent than with aqueous solutions of the copolymer. The demand for stable, water white solutions of the present copolymers in deionized water has been the subject of much experimentation; however none of the prior stabilization processes have produced solutions which are desirable in all respects or which exhibit stability over long periods of a year or more. It is now discovered that in order to obtain a highly desirable product, certain critical processing parameters in conjunction with borane complex contact must be maintained during solvent exchange. Only by the observance of these criteria can the aqueous copolymer solutions, having both color and odor stability of this invention, be obtained.

More specifically, the aqueous copolymer solutions of the present invention are prepared by incorporating the borane complex immediately upon recovery of the 10–80 wt. %, preferably 40–70 wt. %, copolymeric solids in alcohol from the polymerization zone or, when solvent exchange with water is required, incorporating the complex prior to the alcohol stripping operation. The borane complex can be added either to the deionized water feed or to the alcohol solvent-copolymer mixture before stripping. Additionally it is important that the solvent exchange by alcohol stripping be performed under a vacuum at a relatively low temperature, i.e. under between about 100 and 740 mm Hg below absolute and at from about 35° to 85° C., preferably under between about 160 and about 700 mm Hg below absolute and from about 40° to about 65° C.

The solvent exchange with water can be carried out in (a) a single operation with from about 100 to 150 volume % water based on alcohol present in the copolymer-alcohol mixture or (b) as a staged stripping operation using from about 100 to about 150 volume % water based on alcohol. In the latter case, the entire amount of the borane complex can be introduced into the first stripping stage or incremental amounts of the required total can be added in several stripping stages. The water introduced between vacuum distillations can be of equal amounts or can be increased or decreased in subsequent alcohol stripping stages. Since the alcohol recovered from the stripping zone or zones is substantially pure, it can be recycled to the polymerization reactor as solvent for fresh monomer feed, thus the process can be carried out as a more economical continuous operation as well as in batch when desired. Most advantageously, the process is operated with alcohol recycle and stripping with deionized water in a volume equal or approximately equal to the volume of alcohol present in the copolymeric solution undergoing treatment. The deionized water used in the exchange is of high purity such as that obtained from deionization in a closed system where mold, organics and dust cannot contaminate the product. By observing the above conditions, long term stability of aqueous and alcoholic VP/VA copolymer solutions having less than 50 APHA color at a 50 wt. % solids concentration is obtained. Similar color and odor stability is achieved for the other N-vinyl heterocyclic copolymers of this invention. If desired for further processing, the aqueous solution of the copolymer can be dried to provide stable colorless resin suitable for extrusion into filaments.

The color stability of the present VP/VA solutions, (50% solids), measured at room temperature using a Klett cell, 20×80 mm, on a Hunter Colorimeter (Model D25 P-9, exhibited no discoloration over the period of 13 months.

In addition to the copolymer solutions containing the borane stabilizer, between about 0.05 and about 2 wt. %, more often between about 0.1 and about 0.4 wt. %, of a buffer such as an alkali metal -acetate, -carbonate, -bicarbonate or a mono- or di- basic sodium or potassium phosphate can be included in the final copolymeric solution to insure a desirable pH within the range of 4 to 7. Other additives optionally employed in the aqueous solution of the copolymeric product include up to 5 wt. % of a preservative e.g. GERMALL®, GLYDANT® and others.

Having generally described the invention, reference is now had to the following examples which illustrate preferred embodiments but which are not to be construed as limiting to the scope of the present invention as more broadly defined above and in the appended claims.

EXAMPLE 1

A colorless solution containing 100 g. isopropanol and 100 g. of N-vinyl-2-pyrrolidone/vinyl acetate copolymer (70:30 parts by weight) was prepared. The solution was introduced into a rotary evaporator wherein isopropanol was replaced with water. 100 g. of deionized water was added in the evaporator. The resulting solution was then subjected to vacuum distillation at about 25 mm Hg at 40° C. over a period of 35 minutes, during which about 100 g. of liquid was removed as distillate. Another 100 g. of deionized water was then added to the evaporator and another 100 g. of distillate removed. The resulting aqueous solution, containing 100 g. of the copolymer, 100 g. of water and less than 0.2 g. isopropanol was cooled to room temperature and recovered as the colorless, odorless product of the process. The product was divided into two 100 g. samples, A and B. To sample A, 0.2 g. of borane-trimethylamine complex was added while sample B was left untreated. Both samples were then stored in a 50° C. oven for a period of 10 months, after which they were examined. Sample A treated with the borane-trimethylamine complex was considered colorless with an APHA color of 55.1. Conversely, untreated sample B developed a deep yellow color, APHA measuring 1,000.

EXAMPLE 2

A 50 wt. % solids solution of 100 g. VP/VA (70:30) in 100 g. of isopropyl alcohol was obtained from the nitrogen purged solution polymerization of VP and VA at 85° C. in the presence of 0.6 g. of 2,2-azobis(2-methyl-butane-nitrile) initiator. This solution was separated into two samples (C-D) of 100 g. each.

To sample C, 0.2 g. of borane-tert-butyl amine complex was added immediately after completion of the polymerization; whereas sample D was not treated with stabilizer. The APHA color of samples C and D was measured immediately polymerization and again after 12 months of storage at room temperature. The results are as reported in Table 1 A.

Example 2 was repeated four more times, except that the following stabilizer complexes were substituted borane-trimethylamine complex:

| STABILIZER COMPLEX | SAMPLES |
| --- | --- |
| Borane-ammonia | E and F |
| Borane-morpholine | G and H |
| Tetramethylammonium octahydrotriborate | I and J |
| Borane-4-ethyl morpholine | K and L |

The APHA color of these samples is also reported in Table 1 A.

EXAMPLE 3

A 50% solids polymer isopropanol solution prepared as in Example 2 was divided into two samples (M and N) of 100 g. each. As above, 0.2 g. of borane-tert-butyl amine was added immediately upon completion of the polymerization while the second sample remained untreated. Both samples were then subjected to solvent exchange with pure deionized water (less than 0.001% organics) by stripping isopropanol at 40° C. under 20 mm Hg with 50 g. of water in a rotary evaporator. The APHA color of these aqueous copolymer samples M and N was taken immediately after completion of the solvent exchange and again after 12 months storage at room temperature. These results are reported in Table 1 B.

Example 3 was repeated four more times except that the borane-trimethyleneamine was substituted with other boron complex species, namely, those mentioned above.

| STABILIZER COMPLEX | SAMPLES |
| --- | --- |
| Borane-ammonia | O and P |
| Borane-morpholine | Q and R |
| Tetramethylammonium octahydrotriborate | S and T |
| Borane-4-ethylmorpholine | U and V |

The APHA color of these samples is also reported in Table 1 B.

EXAMPLE 4

A 70:30 VP/VA copolymer 250 g. in 250 g. isopropanol (50% solids) obtained by solution polymerization at 85° C. was subjected to staged deionized water solvent exchange under 10 mm Hg at increasing temperatures of from 16° C. to 23° C. The solvent exchange was repeated twice in a rotary evaporator. Each time 250 g. of water was added at the beginning and 250 g. of liquid was distilled out at the end of distillation. Before the first water addition, 0.50 g. (0.2% of the copolymer) of borane-t-butylamine complex was dissolved in water and used as a color stabilizer. No stabilizer agent was added at the second solvent exchange stage.

The above stabilized aqueous solution (100 g.), containing 50% copolymer and less than 0.1% isopropanol, was colorless and odorless after 6 months storage at room temperature (initial APHA color 18.0 and final APHA color 10.2).

A similar sample of the copolymer which was not treated with stabilizing complex noticeably yellowed within a few hours after the completion of solvent exchange, with the initial APHA at 74.8. After 6 months storage at room temperature, the yellow color deepened to a APHA color of 145.

TABLE 1A

APHA COLOR OF VP/VA (70:30) COPOLYMER ISOPROPANOL SOLUTIONS (50% SOLIDS)

| | Sample | | | | | |
| --- | --- | --- | --- | --- | --- | --- |
| | F | E | D | C | H | G |
| | Borane-Ammonia Complex* | | Borane-tert-butyl amine Complex | | Borane-morpholine Complex | |
| | no borane | 0.2 g borane | no borane | 0.2 g borane | no borane | 0.1 g borane |
| Initial APHA | 42.9 | 9.6 | 46 | 16.2 | 14.3 | 36.3 |
| APHA after 1 year | 105 | 10.2 | 75.5 | 26.4 | 61.4 | 38.6 |

| | Sample | | | |
| --- | --- | --- | --- | --- |
| | J | I | L | K |
| | Tetramethyl-ammonium Octahydro-triborate | | Borane 4-Ethyl morpholine Complex | |
| | no borane | 0.1 g borane | no borane | 0.1 g borane |
| Initial APHA | 97.2 | 13.8 | 13.5 | 52.2 |
| APHA after 1 year | 117 | 17.1 | 71.3 | |

*0.02 g. of acetic acid was added in to prevent the ammonia odor and to control pH

TABLE 1B

APHA COLOR OF VP/VA (70:30) COPOLYMER AQUEOUS SOLUTIONS (50% SOLIDS)

| | Sample | | | | | |
|---|---|---|---|---|---|---|
| | P | O | N | M | R | Q |
| | Borane-Ammonia Complex* | | Borane-tert-butyl amine Complex | | Borane-morpholine Complex | |
| | no borane | 0.1 g borane | no borane | 0.1 g borane | no borane | 0.1 g borane |
| Initial APHA | 245 | 9.0 | 211 | 17.5 | 200 | 50.1 |
| APHA after 1 year | 414 | 11.7 | 228 | 14.3 | 242 | 32.1 |

| | Sample | | | |
|---|---|---|---|---|
| | T | S | U | V |
| | Tetramethyl-ammonium Octahydro-triborate | | Borane 4-Ethyl morpholine Complex | |
| | no borane | 0.1 g borane | no borane | 0.05 g borane |
| Initial APRA | 195 | 19.3 | 236 | 43.2 |
| APHA after 1 year | 291 | 3.4 | 292 | 73.5 |

*0.02 g. of acetic acid was added in to prevent the ammonia odor and to control pH

What is claimed is:

1. A clear, stable aqueous or alcohol solution of (a) between about 10 and about 70 wt. % based on total composition of a copolymer derived from about 40 to about 80 wt. % of a N-vinyl heterocyclic monomer having from 3 to 6 ring carbon atoms and from about 60 to about 20 wt. % of a vinyl comonomer and (b) between about 0.02 and about 2 wt. %, based on copolymer of a nitrogen containing, trivalent boron complexed compound.

2. The solution of claim 1 wherein the N-vinyl heterocyclic monomer is N-vinylpyrrolidone or N-vinyl caprolactam optionally substituted on a ring carbon atom with methyl.

3. The solution of claim 2 wherein the N-vinyl heterocyclic monomer is N-vinylpyrrolidone.

4. The solution of claim 1 wherein said comonomer is selected from the group consisting of a $C_1$ to $C_4$ alkyl vinyl ester, acrylonitrile, styrene and mixtures thereof.

5. The solution of claim 4 wherein said comonomer is vinyl acetate and the weight ratio of monomer to comonomer is between about 50 and about 80 wt. % heterocyclic monomer to between about 50 and about 20 wt. % vinyl acetate.

6. The solution of claim 5 wherein the weight ratio is 55–70 wt. % N-vinylpyrrolidone to 45–30 wt. % vinyl acetate.

7. The solution of claim 1 wherein said boron complexed compound is a borane selected from the group of borane-ammonia, borane $C_1$ to $C_4$ alkyl amine, tetra $C_1$ to $C_4$ alkyl ammonium octahydrotriborate, morpholine-borane, $C_1$ to $C_4$ alkyl morpholine-borane, silylamino borane and mixtures thereof.

8. The solution of claim 7 wherein said borane complex is an organic compound.

9. The solution of claim 8 wherein said borane complex is tetramethyl ammonium octahydrotriborate.

10. The solution of claim 8 wherein said borane complex is borane-tertiary butyl amine.

11. The solution of claim 7 wherein said borane complex is borane-ammonia containing from about 0.005 to about 1 wt. % of an organic acid.

12. The solution of claim 11 wherein said organic acid is acetic acid.

13. The solution of claim 1 wherein said nitrogen containing trivalent boron complexed compound is between about 0.05 and about 0.2 wt. % of the copolymer.

14. A personal care formulation containing an effective film-forming amount of the solution of claim 1.

* * * * *